United States Patent
Hubis (10) Patent No.: US 11,714,925 B2
(45) Date of Patent: Aug. 1, 2023

(54) ASSURING INTEGRITY AND SECURE ERASURE OF CRITICAL SECURITY PARAMETERS

(71) Applicant: Micron Technology, Inc., Boise, ID (US)

(72) Inventor: Walter Andrew Hubis, Westminster, CO (US)

(73) Assignee: Micron Technology, Inc., Boise, ID (US)

(*) Notice: Subject to any disclaimer, the term of this patent is extended or adjusted under 35 U.S.C. 154(b) by 160 days.

(21) Appl. No.: 17/116,760

(22) Filed: Dec. 9, 2020

(65) Prior Publication Data

US 2022/0180006 A1    Jun. 9, 2022

(51) Int. Cl.
*G06F 21/79* (2013.01)
*G11C 16/34* (2006.01)
*G06F 21/60* (2013.01)
*G06F 21/57* (2013.01)

(52) U.S. Cl.
CPC ............ *G06F 21/79* (2013.01); *G06F 21/572* (2013.01); *G06F 21/602* (2013.01); *G11C 16/3472* (2013.01)

(58) Field of Classification Search
CPC ...... G06F 21/79; G06F 21/572; G06F 21/602; G06F 21/78; G06F 3/0652; G06F 3/0656; G11C 16/3482; G11C 16/20; G11C 16/22; G11C 16/0483; G11C 16/14
See application file for complete search history.

(56) References Cited

U.S. PATENT DOCUMENTS

| | | | | |
|---|---|---|---|---|
| 6,584,559 | B1* | 6/2003 | Huh | G06F 8/60 713/1 |
| 2006/0107071 | A1* | 5/2006 | Girish | G06F 21/572 713/191 |
| 2007/0088940 | A1* | 4/2007 | Conley | G11C 16/20 713/1 |
| 2014/0344797 | A1* | 11/2014 | Rajagopalan | G06F 8/61 717/169 |
| 2020/0272449 | A1* | 8/2020 | Wang | H04L 67/34 |

* cited by examiner

*Primary Examiner* — Philip J Chea
*Assistant Examiner* — Sangseok Park
(74) *Attorney, Agent, or Firm* — Schwegman Lundberg & Woessner, P.A.

(57) ABSTRACT

A processing device sets a first flag that indicates whether a first critical security parameter (CSP) file exists. The first CSP file includes a first set of CSPs for a memory device. The processing device sets a second flag that indicates whether the first CSP file is valid. The processing device sets a third flag that indicates whether a second CSP file exists. The second CSP file includes a second set of CSPs for the memory device. The processing device sets a fourth flag that indicates whether the second critical security parameter file is valid. The processing device selects one of the first or second CSP file as an active CSP file based on an evaluation of the first, second, third, and fourth flags.

18 Claims, 6 Drawing Sheets

ASSURING INTEGRITY AND SECURE ERASURE OF CRITICAL SECURITY PARAMETERS

TECHNICAL FIELD

Embodiments of the disclosure relate generally to memory sub-systems and, more specifically, to assuring the integrity and secure erasure of critical security parameters in a memory sub-system.

BACKGROUND

A memory sub-system can include one or more memory devices that store data. The memory components can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to a security capsule for accessing restricted features of a memory device in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a negative-and (NAND) memory device. Other examples of non-volatile memory devices are described below in conjunction with FIG. 1. Some memory devices, such as NAND memory devices, include an array of memory cells (e.g., flash cells) to store data. Each cell includes a transistor, and within each cell, data is stored as the threshold voltage of the transistor, based on the logical value of the cell (e.g., 0 or 1). Memory cells in these devices can be grouped as pages that can refer to a logical unit of the memory device used to store data. For example, memory cells in NAND memory devices are connected horizontally at their control gates to a word line to form a page. With some types of memory devices (e.g., NAND), pages are grouped to form blocks (also referred to herein as "memory blocks").

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

A memory sub-system may store confidential, proprietary, or other sensitive information that should only be accessed by specifically authorized users. Critical security parameters (CSPs) such as cryptographic keys are used to protect sensitive information stored by the memory sub-system. For example, Public Key Infrastructure (PKI) is often used to cryptographically sign and verify sensitive information to derive a trust of origin and a capability to detect unauthorized modification.

A cryptographic erasure process is used when CSPs are to be erased or randomized. There are a number of considerations to assure the integrity and security of CSPs during a cryptographic erasure process. For example, it must be assured that in performing a cryptographic erase of a key, that any copy of a key is completely and irrevocably removed. Further, cryptographic erasure techniques should be capable of an unlimited number of sanitization cycles and should be able to prove that all CSPs have been removed all while assuring high integrity of the CSP. Care must be used when erasing CSPs to assure that any power-loss situations do not result in loss of data.

Aspects of the present disclosure relate to a memory sub-system that executes a cryptographic erasure process that addresses the above and other considerations regarding integrity and security of CSPs. In an example memory sub-system, CSPs such as data encryption keys (DEKs) used to encrypt data stored on memory media and credentials used to authenticate users and administrators are stored in a persistent memory device (e.g., a persistent NAND device). A file manager (e.g., file system archiving (FSA)) of the memory sub-system stores duplicate copies of CSPs across multiple memory devices to provide redundancy and fault protection in the event that one or more portions of a device fails. The file manager stores multiple copies of the CSPs to provide redundancy. CSPs are securely erased by performing a block erase function on a memory block (e.g., a NAND block) on which the CSPs are stored. The erase process does not return an indication of successful completion until the erasure has been successfully executed.

The memory sub-system can cryptographically erase an entire memory device, specific namespaces, or specific ranges while exercising care to securely erase only the affected keys while preserving the integrity of other CSPs. If the erase command fails, the response depends on the method used to invoke the erase function. In general, the memory sub-system can retry the operation, but in all cases, the memory sub-system assumes that the keys are still present, and the sanitize command is aborted.

When performing a cryptographic erase, the memory sub-system assures that any and all copies of the CSPs are erased. In the file manager, all backup copies of the CSPs must be successfully erased for the erase operation to succeed. If any of the erase operations fail, the erasure of the CSPs cannot be guaranteed and the memory sub-system returns an error. If the cryptographic erase process fails, the failure status is returned to the host to allow the host to handle the issue as appropriate.

Loss of certain CSPs such as DEKs can result in loss of large amounts of data that are protected by CSPs. Accordingly, to provide protection of CSPs against corruption and errors due to power fail or other system failures during updates, a security manager is included in the memory sub-system to assure security and integrity of these CSPs and prevent loss of data. As an example, to provide integrity of the CSPs during updates, the security manager uses two files for storing CSPs, though only a single file is active at any time. Updates are written to a second file while the first file is left intact to assure that a valid file is available, even if a power fail or other fatal error occurs during the update process. Once the second file has been successfully stored, the security manager erases the first file, and sets the second file as the active file. Importantly, the update process is atomic: an update is either successful, or if failed, the original data is preserved. In this manner, all protected keys and credentials are completely updated any time a single CSP is changed.

The security manager of the memory sub-system is also responsible for protecting CSPs at system initialization. For example, during system initialization (e.g., at power on), the security manager determines which of the two files to use, given that an error may have occurred. The security manager determines whether both files exist and whether both files are valid. The security manager evaluates which file to use based at least on whether each file exists and is valid. The security manager selects one file based on the evaluation and erases the other.

With the example memory sub-system described herein, the integrity and security of CSPs during a cryptographic erasure process is assured. Additionally, the techniques described herein can, in some embodiments, be implemented without the need for specific hardware to support integrity and security.

Figure 1:
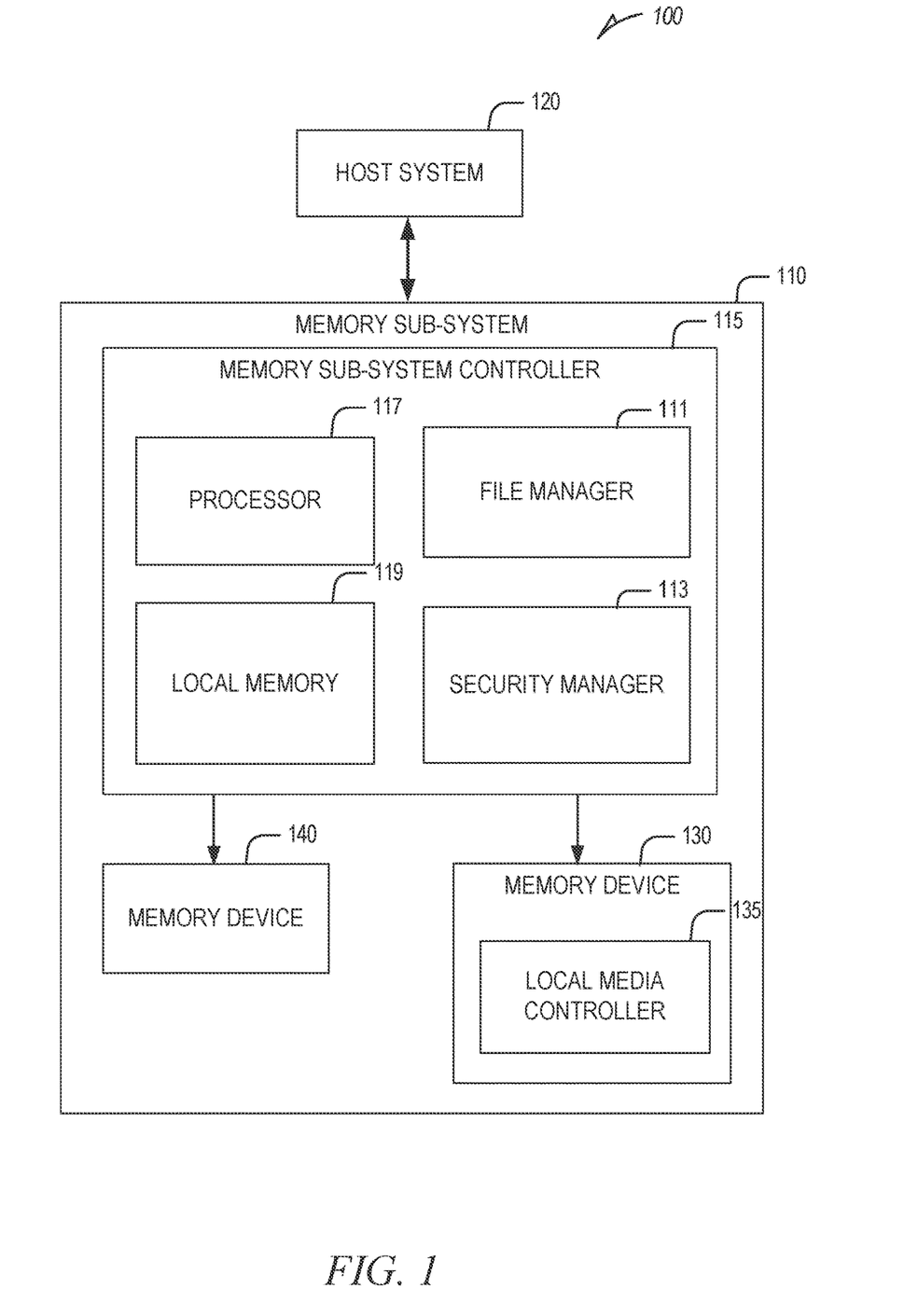
FIG. 1 illustrates an example computing environment that includes a memory sub-system, in accordance with some embodiments of the present disclosure.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include multiple host systems that are coupled to one or more memory sub-systems 110. In some embodiments, the host system 120 is coupled to different types of memory sub-system 110. FIG. 1 illustrates example host system 120 that is coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a host interface. Examples of a host interface include, but are not limited to, a SATA interface, a PCIe interface, USB interface, Fibre Channel, Serial Attached SCSI (SAS), Small Computer System Interface (SCSI), a double data rate (DDR) memory bus, a DIMM interface (e.g., DIMM socket interface that supports Double Data Rate (DDR)), Open NAND Flash Interface (ONFI), Double Data Rate (DDR), Low Power Double Data Rate (LPDDR), or any other interface. The host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and 3D NAND.

Each of the memory devices 130 can include one or more arrays of memory cells. One type of memory cell, for example, single level cells (SLC), can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. For example, memory cells in NAND memory devices are connected horizontally at their control gates to a word line to form a page. With some types of memory (e.g., NAND), pages can be grouped to form blocks. Additionally, word lines within a memory device can be organized into multiple word line groups, each of which includes one or more word lines, though each word line group includes fewer word lines than are included in a block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application-specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 and convert responses associated with the memory devices 130 and/or the memory device 140 into information for the host system 120.

In some embodiments, the memory devices 130 include local media controller 135 that operates in conjunction with memory sub-system controller 115 to execute operations on one or more memory cells of the memory devices 130.

The memory sub-system 110 also includes a file manager 111. The file manager 111 stores duplicate copies of CSPs across the memory devices 130 and 140 to provide redundancy and fault protection in the event that one or more portions of the device fails.

The memory sub-system 110 also includes a security manager 113 that is responsible for assuring the security and integrity of CSPs. The security manager 113 protects CSPs against corruption and errors due to power failure or other system failures during updates. For example, to provide integrity of the CSPs during updates, the security manager uses two files for storing CSPs, though only a single file is active at any time. An example of the file used for storing CSPs (also referred to as a "CSP file") is described below in reference to FIG. 2. Updates are written to a second file while the first file is left intact to assure that a valid file is available, even if a power failure or other fatal error occurs during the update process. Once the second file has been successfully stored, the security manager erases the first file and sets the second file as the active file. Further details regarding updates to a CSP file are discussed below in reference to FIG. 5.

The security manager 113 is also responsible for protecting CSPs at system initialization. For example, during system initialization (e.g., at power on), the security manager 113 determines which of the two files to use, given that an error may have occurred. The security manager 113 evaluates which file to use based at least on whether each file exists and is valid, selects one file based on the evaluation, and erases the other. Further details regarding a method for protecting CSPs at system initialization are discussed below in reference to FIGS. 3 and 4.

In some embodiments, the memory sub-system controller 115 includes at least a portion of the security manager 113. For example, the memory sub-system controller 115 can include a processor 117 (processing device) configured to execute instructions stored in local memory 119 for performing the operations described herein. In some embodiments, at least a portion of the security manager 113 is part of the host system 120, an application, or an operating system.

Figure 2:
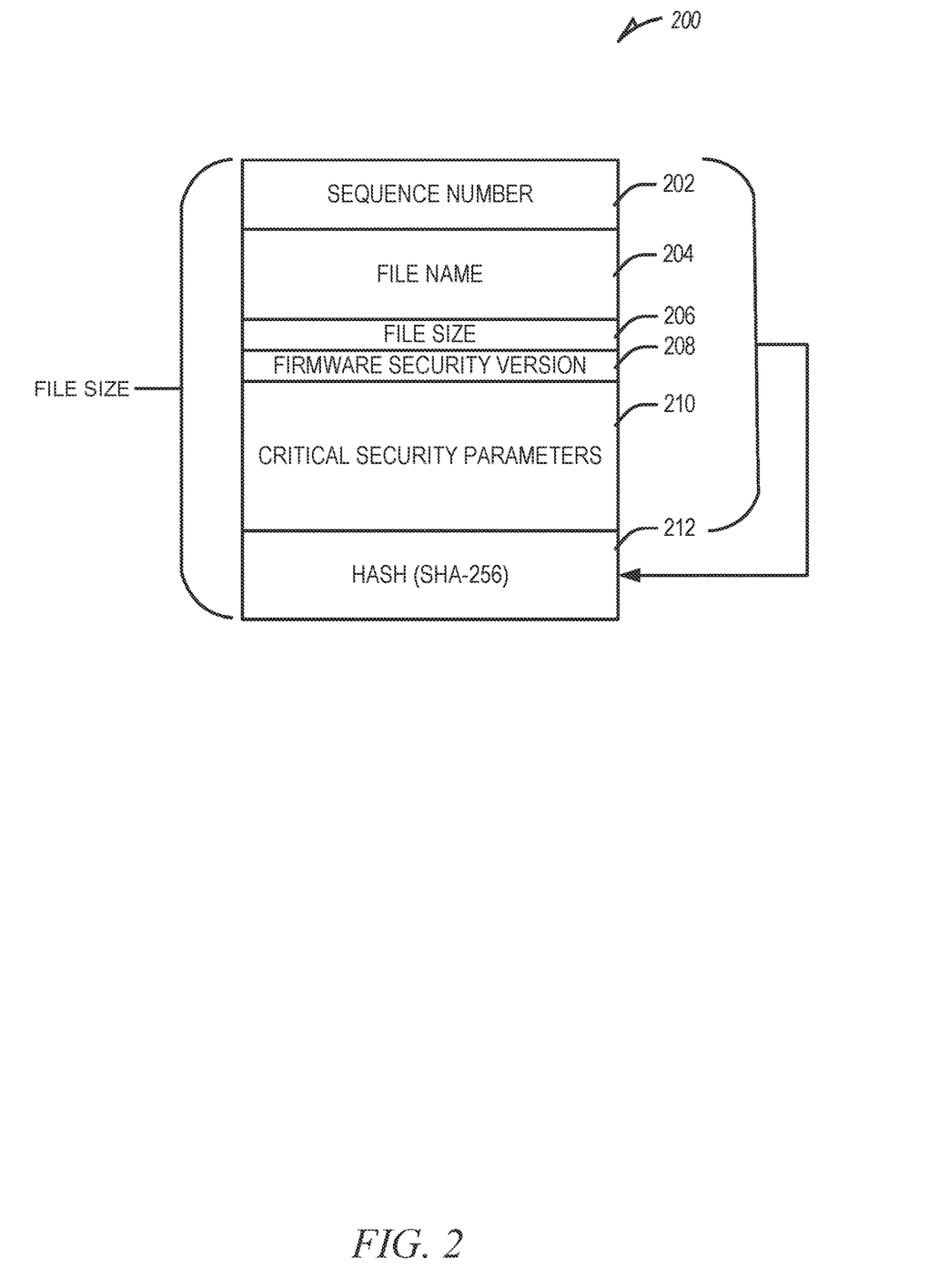
FIG. 2 is data structure diagram illustrating an example file structure for protecting critical security parameters, in accordance with some embodiments of the present disclosure.

FIG. 2 is data structure diagram illustrating an example file 200 for protecting critical security parameters, in accordance with some embodiments of the present disclosure. As shown, the file 200 includes a sequence number 202, a file name 204, a file size 206, a firmware security version 208, CSPs 210, and a hash 212.

The sequence number 202 is a monotonic incrementing counter. The sequence number 202 is initialized to zero when a memory device (e.g., the memory device 130 or 140) is transitioned out of the manufacturing state and is incremented each time the file 200 is updated.

The file name 204 includes an identifier of the file 200 that can be used for easy identification of the file 200 during development and debug. As an example, the file name 204 can be a UTF-8 encoded file name with a null termination.

The file size 206 indicates a file size of the file 200 including all fields of the file 200. The firmware security version 208 is a security version of the file 200 that is used to determine if the file 200 is valid and to define a format for the file 200.

The CSPs 210 include the keys and credentials that are to be protected. All keys and credentials that are included in the CSPs 210 are encrypted to provide confidentiality, though no further restrictions are placed on the CSPs 210.

The hash 212 includes a hash of the entire file 200 to determine the integrity of the file 200. In some embodiments, SHA-256 is used to generate the hash 212 based on the file 200.

Figure 3:
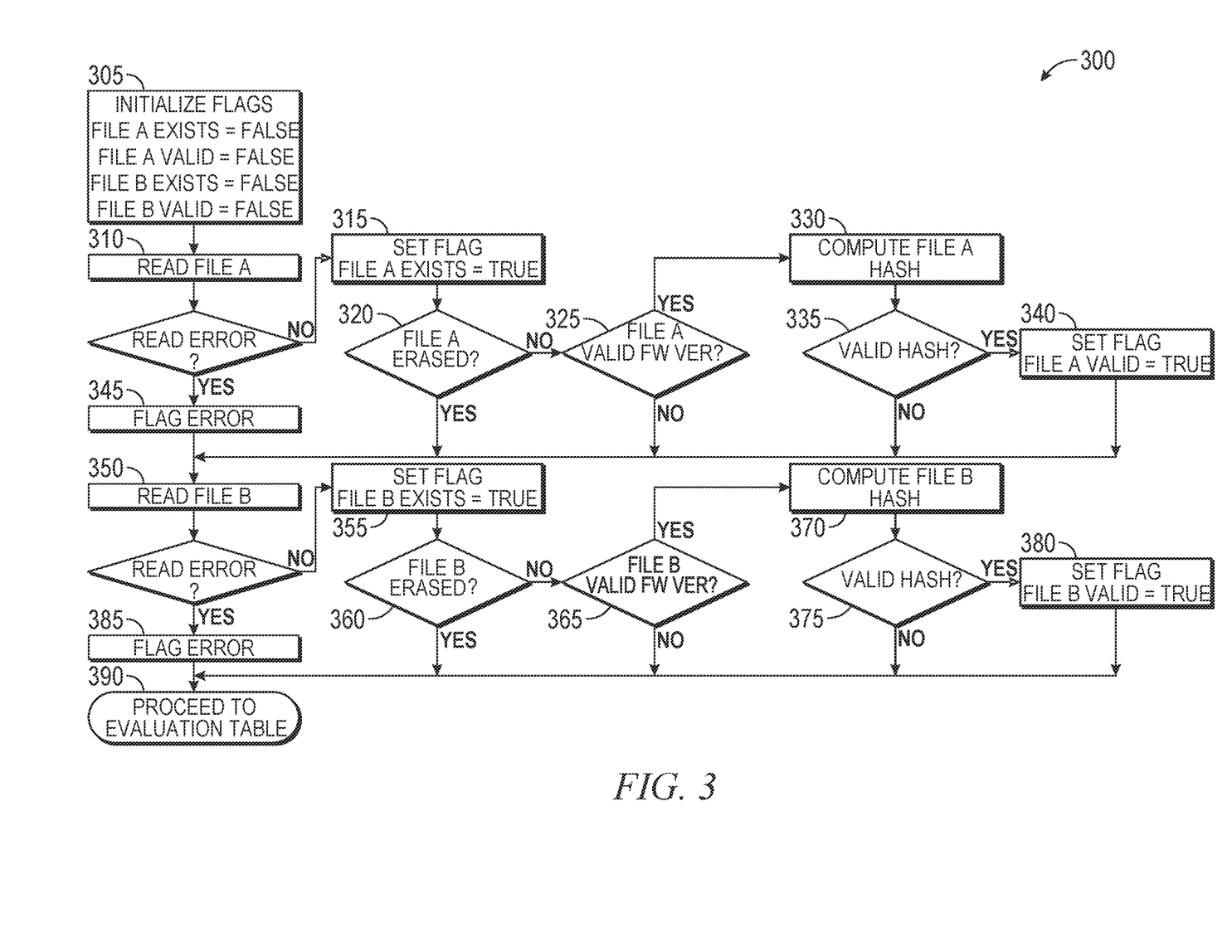
FIGS. 3 and 4 is a flow diagram illustrating an example method for protecting critical security parameters during initialization of a memory sub-system, in accordance with some embodiments of the present disclosure.
Figure 4:
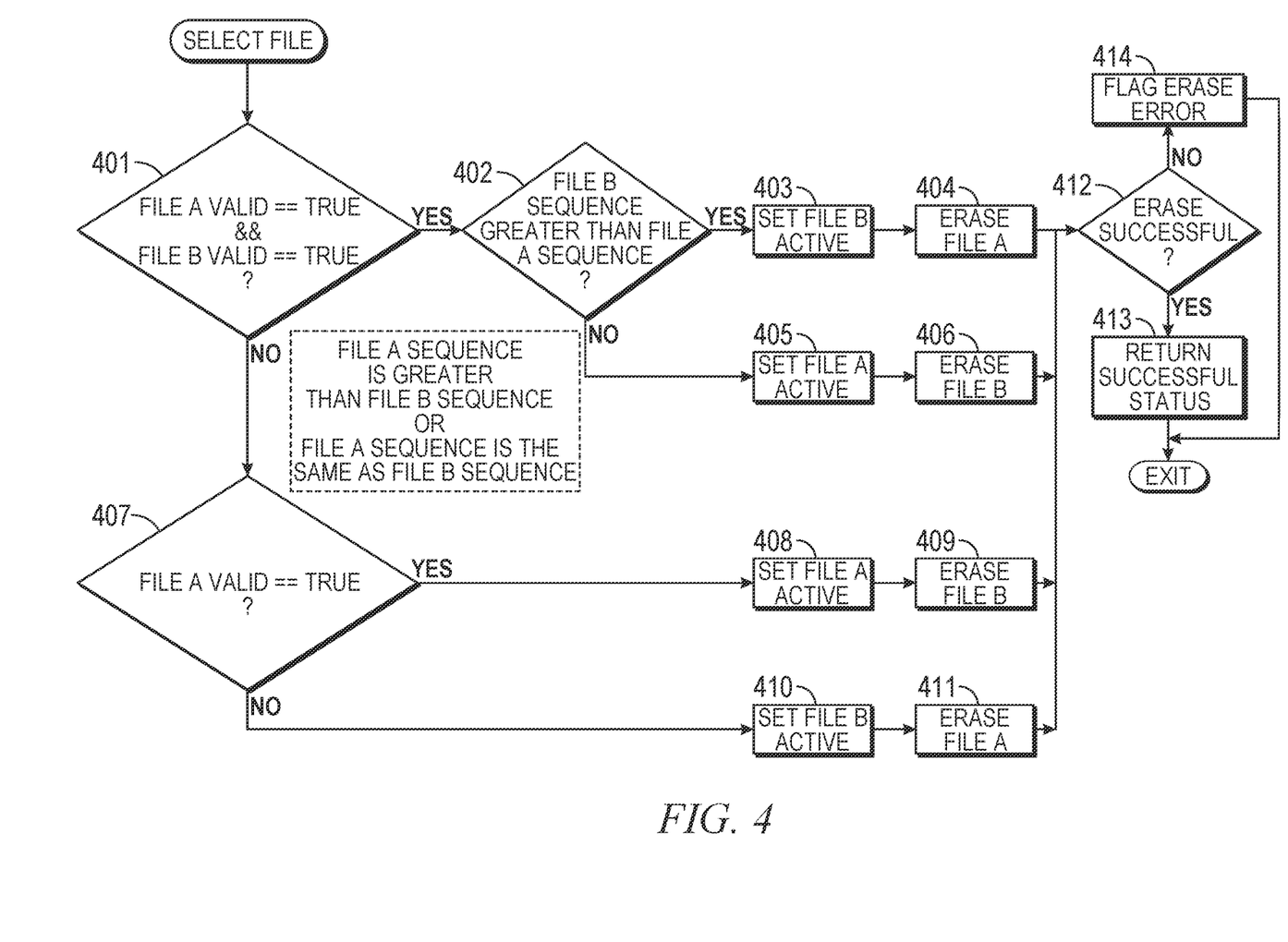

As noted above, two files are maintained by the security manager 113 to assure security and integrity of CSPs. That is, two instances of the file 200 can be maintained to assure security and integrity of CSPs. At system initialization, the security manager 113 selects one of the files to use as the active file. Accordingly, FIGS. 3 and 4 is a flow diagram illustrating an example method 300 for selecting an active CSP file during initialization of a memory sub-system, in accordance with some embodiments of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the security manager 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device initializes a set of flags associated with one or more CSPs. The set of flags includes: a first flag to indicate whether a first CSP file exists ("File A Exists"); a second flag to indicate whether the first CSP file is valid ("File A Valid"); a third flag to indicate whether a second CSP file exists ("File B Exists"); and a fourth flag to indicate whether the second CSP file is valid ("File B Valid"). In initializing the set of flags, the processing device sets each flag to FALSE.

The processing device executes a read operation on a first CSP file (see operation 310). If the read operation returns a read error, the method 300 proceeds to operation 345 where the processing device flags the read error. In flagging the read error, the processing device can provide an indication of the read error to a host system. If the read operation executed at operation 310 is successful (e.g., a read error is not returned), the method 300 proceeds to operation 315 where the processing device sets the first flag to TRUE ("File A Exists=TRUE") to indicate that the first CSP file exists. Hence, whether the first flag is set to TRUE or FALSE depends on an outcome of the read operation on the first CSP file.

At operation 320, the processing device determines whether the first CSP file is erased. If the processing device determines the first CSP file is erased, the method 300 proceeds to operation 350 where the processing device executes a read operation on a second CSP file.

If the processing device determines the first CSP file is not erased, the method 300 proceeds to operation 325 where the processing device determines whether a firmware security version (e.g., firmware security version 208) of the first CSP file is valid. If the processing device determines the firmware security version is not valid, the method proceeds to operation 350.

If the processing device determines the firmware security version is valid, the method 300 proceeds to operation 330 where the processing device computes a first hash based on the first CSP file. More specifically, the processing device computes the first hash based on the following portions of the first CSP file: a sequence number (e.g., sequence number 202), a filename (e.g., file name 204), file size (e.g., file size 206), the firmware security version and critical security parameters included in the first CSP file. Consistent with some embodiments the processing device can use one of several known hash algorithms such as SHA-256 to compute the first hash. At operation 335, the processing device determines whether the first hash is valid based on a result of a comparison of the first hash to the hash (e.g., hash 212) included in the first CSP file. That is, the processing device compares the first hash with the hash in the first CSP file, and if they are the same, the first hash is valid. If the processing device determines the first hash is valid, the processing device sets the second flag to TRUE ("File A Valid=TRUE") to indicate that the first CSP file is valid, at operation 340.

If the processing device determines at operation 335 that the first hash is invalid, the method 300 proceeds to operation 350. As noted above, at operation 350, the processing device executes a read operation on a second CSP file. If the read operation returns a read error, the method 300 proceeds to operation 385 where the processing device flags the read error. In flagging the read error, the processing device can provide an indication of the read error to the host system. If the read operation executed at operation 350 is successful (e.g., a read error is not returned), the method 300 proceeds to operation 355 where the processing device sets the third flag to TRUE ("File B Exists=True") to indicate that the second CSP file exists.

At operation 360, the processing device determines whether the second CSP file is erased. If the processing device determines the second CSP file is erased, the method 300 proceeds to operation 390 where the processing device accesses an evaluation table.

If the processing device determines the second CSP file is not erased, the method 300 proceeds to operation 365 where the processing device determines whether a firmware security version (e.g., firmware security version 208) of the second CSP file is valid. If the processing device determines the firmware security version is not valid, the method proceeds to operation 390.

If the processing device determines the firmware security version is valid, the method 300 proceeds to operation 370 where the processing device computes a second hash based on the second CSP file in the manner described above in reference to the first CSP file. At operation 375, the processing device determines whether the second hash is valid by comparing the second hash to the hash included in the second CSP file (e.g., hash 212). If the processing device determines the first hash is valid, the processing device sets the fourth flag to TRUE ("File B Valid=TRUE") to indicate that the second CSP file is valid, at operation 380.

If the processing device determines that the second hash is invalid, the method 300 proceeds to operation 390. As referenced above, at operation 390, the processing device determines which of the CSP files to set as the active CSP file. In some embodiments, the processing device can access an evaluation table to determine which CSP file to use, if any, based on the set of flags. An example evaluation table is shown below.

TABLE 1

EVALUATION TABLE

| FILE A EXISTS | FILE A VALID | FILE B EXISTS | FILE B VALID | ACTION |
|---|---|---|---|---|
| TRUE | TRUE | TRUE | TRUE | PERFORM FURTHER EVALUATION |
| TRUE | TRUE | FALSE | N/A | USE FILE A |
| TRUE | TRUE | TRUE | FALSE | USE FILE A |
| FALSE | N/A | TRUE | TRUE | USE FILE B |
| TRUE | FALSE | TRUE | TRUE | USE FILE B |
| FALSE | N/A | FALSE | N/A | FLAG ERROR |
| TRUE | FALSE | FALSE | N/A | FLAG ERROR |
| FALSE | N/A | TRUE | FALSE | FLAG ERROR |

In accordance with the example evaluation table presented above, if the set of flags are set to TRUE, the processing device performs further evaluation of the CSP files. That is, if both the first and second CSP files exist and are valid, the processing device performs further evaluation.

As shown in FIG. 4, the method 300 can, in some embodiments, include operations 401-414. Consistent with these embodiments, at least a portion of the operations 401-414 can be performed as part of the operation 390 where the processing device determines which CSP files to set as the active CSP file. Further, consistent with some embodiments, the operations 403-409 correspond to the further evaluation referenced above in the example evaluation table. That is, the processing device may perform the operations 403-409 based on a result of evaluating the set of flags using the evaluation table.

At operation 401, the processing device determines whether both the first and second CSP files are valid. If both CSP files are valid, the method 300 proceeds to operation 402 where the processing device determines whether a sequence number (e.g., sequence number 202) in the second CSP file sequence is greater than a sequence number in the first CSP file. If the second CSP file sequence number is greater than the first CSP file sequence number, the processing device sets the second CSP file as active (operation 403) and erases the first CSP file (operation 404). The processing device can erase the first CSP file by providing or executing a block erase command (e.g., a NAND block erase command) directed at the block (e.g., the NAND block) in the memory device that stores the first CSP file. If the second CSP file sequence number is less than or equal to the first CSP file sequence number, the processing device sets the first CSP file as active (operation 405) and erases the second CSP file (operation 406). The processing device can erase the second CSP file by providing or executing a block erase command directed at the block in the memory device that stores the first CSP file.

If, at operation 401, the processing device determines that at least one of the CSP files is invalid, the method 300 proceeds to operation 407 where the processing device determines whether the first CSP file is valid. If the first CSP file is valid, the processing device sets the first CSP file as active (operation 408) and erases the second CSP file (operation 409). If the first CSP file is invalid, the processing device sets the second CSP file as active (operation 410) and erases the first CSP file (operation 411). As noted above, the processing device can erase a CSP file by providing or executing a block erase command directed at the block storing the CSP file.

At operation 412, which is performed subsequent to one of operations 404, 406, 409, or 411, the processing device determines whether the erasure performed at operations 404, 406, 409, or 411 is successful. That is, the processing device determines whether the first or second CSP file has been successfully erased. If the erasure is successful, the processing device returns a successful status, at operation 413. If the erasure is unsuccessful, the processing device flags an erase error (e.g., sets a flag indicating an erase error), at operation 414. In flagging the erase error, the processing device can provide an indication of the erase error to a host system.

Figure 5:
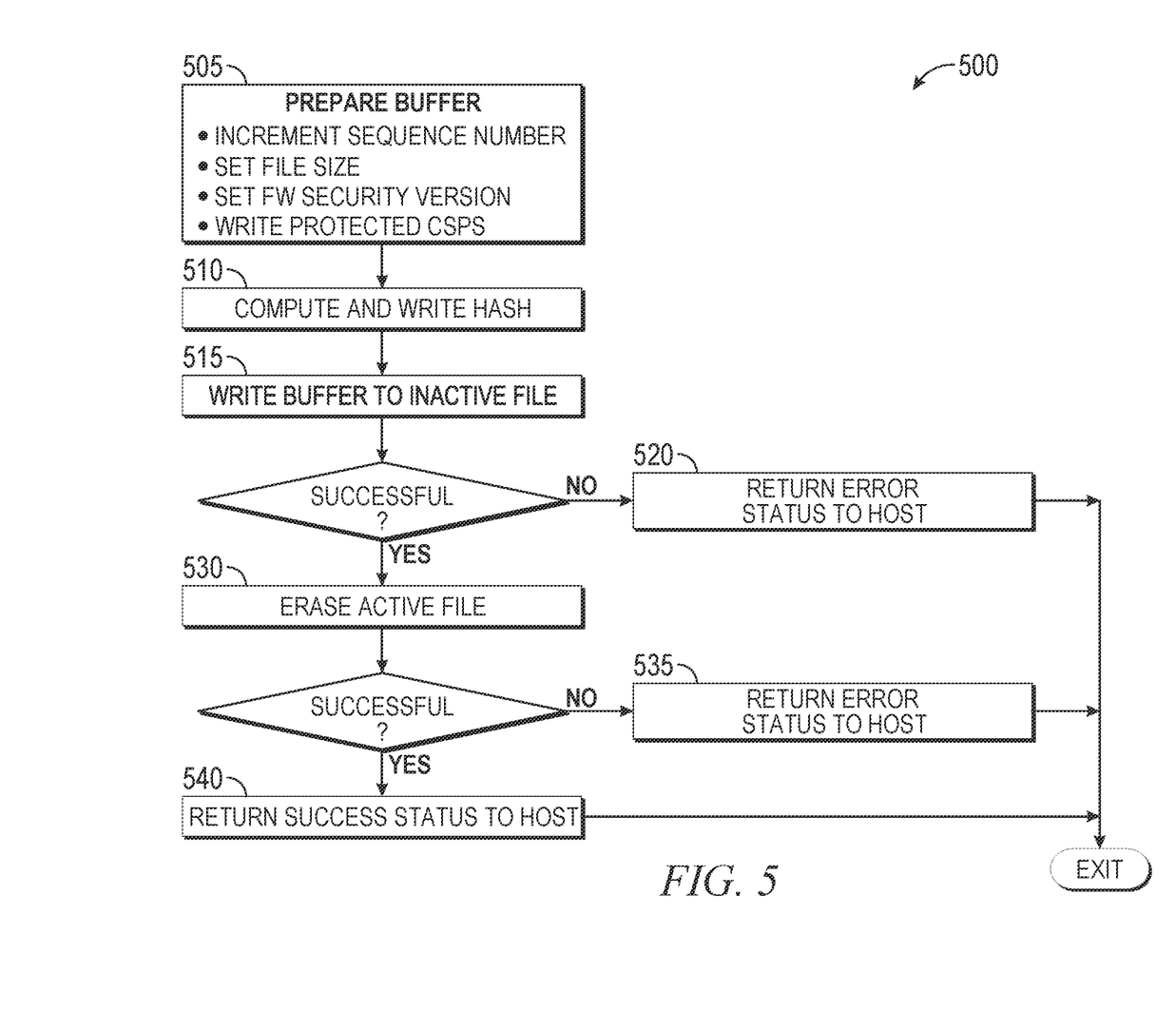
FIG. 5 is a flow diagram illustrating an example method for updating critical security parameters in a memory sub-system, in accordance with some embodiments of the present disclosure.

FIG. 5 is a flow diagram illustrating an example method 500 for updating CSPs in a memory sub-system, in accordance with some embodiments of the present disclosure. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by the security manager 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device prepares a buffer with CSP update data. The CSP update data is used to update one or more CSPs for a memory device (e.g., memory device 130). The CSP update data includes a sequence number (e.g., sequence number 202), a file size (e.g., file size 206), a firmware security version (e.g., firmware security version 208), and one or more CSPs (e.g., CSPs 210). The processing device prepares the buffer by incrementing the sequence number, setting the file size, setting the firmware security version, and writing one or more CSPs (e.g., CSPs 210).

Thereafter, at operation 510, the processing device computes a hash based on the CSP update data (the sequence number, file size, firmware security version, and one or more CSPs), and writes the hash to the buffer. The processing device can use one of several known hash algorithms such as SHA-256 to compute the hash.

The processing device writes the buffer to an inactive CSP file, at operation 515. If the writing of the buffer to the inactive CSP file is unsuccessful, the processing device returns an error status to a host system (e.g., host system 120), at operation 520.

If the buffer is successfully written to the inactive CSP, the processing device erases an active CSP file, at operation 530. If the erasure of the active CSP file is unsuccessful, the processing device returns an error status to the host system, at operation 535. If the erasure is successful, the processing device returns a success status, at operation 540.

It shall be appreciated that the method 500 for updating CSPS is atomic: updates are either successful, or if failed, the original data is preserved. This means that all of the protected keys and credentials are completely updated any time a single CSP is changed.

In view of the disclosure above, various examples are set forth below. It should be noted that one or more features of an example, taken in isolation or combination, should be considered within the disclosure of this application.

Example 1 a system including: a memory device; and a processing device coupled to the memory device, the processing device configured to perform operations including: setting a first flag that indicates whether a rust critical security parameter file exists, the first critical security parameter file including a first set of critical security parameters for the memory device; setting a second flag that indicates whether the first critical security parameter file is valid; setting a third flag that indicates whether a second critical security parameter file exists, the second critical security parameter file including a second set of critical security parameters for the memory device; setting a fourth flag that indicates whether the second critical security parameter file is valid; and selecting one of the first or second critical security parameter file as an active critical security parameter file based on an evaluation of the first, second, third, and fourth flags.

Example 2 includes the system of Example 1, wherein the operations further include: executing a first read operation on the first critical security parameter file, the setting of the first flag being based on an outcome of the first read operation; and executing a second read operation on the second critical security parameter file, the setting of the third flag being based on an outcome of the second read operation.

Example 3 includes the system of any one or more of Examples 1 or 2, wherein the operations further include: determining whether the first critical security parameter file is erased, the setting of the second flag being based in part on whether the first critical security parameter file is erased; and determining whether the second critical security parameter file is erased, the setting of the fourth flag being based in part on whether the second critical security parameter file is erased.

Example 4 includes the system of any one or more of Examples 1-3, wherein: the first critical security parameter file includes a first firmware security version; the second critical security parameter file includes a second firmware security version; and the operations further include: determining whether the first firmware security version is valid, the setting of the second flag being based in part on whether the first firmware security version is valid; and determining whether the second firmware security version is valid, the setting of the fourth flag being based in part on whether the second firmware security version is valid.

Example 5 includes the system of any one or more of Examples 1-4, wherein: the first critical security parameter file includes a first hash; the second critical security parameter file includes a second hash; and the operations further include: computing a third hash based on the first critical security parameter file, the setting of the second flag being based in part on a result of a comparison of the third hash to the first hash; and computing a fourth hash based on the second critical security parameter file, the setting of the fourth flag being based in part on a result of a comparison of the fourth hash to the second hash.

Example 6 includes the system of any one or more of Examples 1-5, wherein the operations further include: evaluating the first, second, third, and fourth flags using an evaluation table.

Example 7 includes the system of any one or more of Examples 1-6, wherein: the first critical security parameter file includes a first sequence number; the second critical security parameter file includes a second sequence number; and the operations further include: evaluating the first and second sequence numbers based on a result of evaluating the first, second, third, and fourth flags using the evaluation table, the active critical security parameter file being selected based on a result of evaluating the first and second sequence numbers.

Example 8 includes the system of any one or more of Examples 1-7, wherein evaluating the first and second sequence numbers include: determining whether the second sequence number is greater than the first sequence number.

Example 9 includes the system of any one or more of Examples 1-8, wherein selecting one of the first or second critical security parameter file as the active critical security parameter file includes selecting the second critical security parameter file as the active critical security parameter file based on determining that the second sequence number is greater than the first sequence number.

Example 10 includes the system of any one or more of Examples 1-9, wherein the operations further include: erasing the first critical security parameter file.

Example 11 includes the system of any one or more of Examples 1-10, wherein selecting one of the first or second critical security parameter file as the active critical security parameter file includes selecting the first critical security parameter file as the active critical security parameter file based on determining that the second sequence number is not greater than the first sequence number.

Example 12 includes the system of any one or more of Examples 1-11, wherein the operations further include: erasing the second critical security parameter file.

Example 13 is a method including setting, by a processing device, a first flag that indicates whether a first critical security parameter file exists, the first critical security parameter file including a first set of critical security parameters for a memory device; setting, by a processing device, a second flag that indicates whether the first critical security parameter file is valid; setting, by a processing device, a third flag that indicates whether a second critical security parameter file exists, the second critical security parameter file including a second set of critical security parameters for the memory device; setting, by a processing device, a fourth flag that indicates whether the second critical security parameter file is valid; and selecting, by a processing device, one of the first or second critical security parameter file as an active critical security parameter file based on an evaluation of the first, second, third, and fourth flags.

Example 14 includes the method of Example 13 and further includes: executing a first read operation on the first critical security parameter file, the setting of the first flag being based on an outcome of the first read operation; and executing a second read operation on the second critical security parameter file, the setting of the third flag being based on an outcome of the second read operation.

Example 15 includes the method of any one or more of Examples 13 or 14 and further includes: determining whether the first critical security parameter file is erased, the setting of the second flag being based in part on whether the first critical security parameter file is erased; and determining whether the second critical security parameter file is erased, the setting of the fourth flag being based in part on whether the second critical security parameter file is erased.

Example 16 includes the method of any one or more of Examples 13-15 and further including: the first critical security parameter file includes a first firmware security version; the second critical security parameter file includes a second firmware security version; and the method further includes: determining whether the first firmware security version is valid, the setting of the second flag being based in part on whether the first firmware security version is valid; and determining whether the second firmware security version is valid, the setting of the fourth flag being based in part on whether the second firmware security version is valid Example 17 includes the method of any one or more of Examples 13-16, wherein: the first critical security parameter file includes a first hash; the second critical security parameter file includes a second hash; and the method further includes: computing a third hash based on the first critical security parameter file, the setting of the second flag being based in part on a result of a comparison of the third hash to the first hash; and computing a fourth hash based on the second critical security parameter file, the setting of the fourth flag being based in part on a result of a comparison of the fourth hash to the second hash.

Example 18 includes the method of any one or more of Examples 13-17, wherein: the first critical security parameter file includes a first sequence number; the second critical security parameter file includes a second sequence number; and the method further includes: evaluating the first and second sequence numbers based on a result of the evaluation of the first, second, third, and fourth flags, the active file being selected based on a result of evaluating the first and second sequence numbers, the evaluating the first and second sequence numbers including determining whether the second sequence number is greater than the first sequence number.

Example 19 includes the method of any one or more of Examples 13-18, wherein: selecting one of the first or second critical security parameter file as the active critical security parameter file includes selecting the second critical security parameter file as the active critical security parameter file based on determining that the second sequence number is greater than the first sequence number; and the method further includes erasing the first critical security parameter file.

Example 20 is a computer-readable storage medium including instructions that, when executed by a processing device, configure the processing device to perform operations including: setting, by a processing device, a first flag that indicates whether a first critical security parameter file exists, the first critical security parameter file including a first set of critical security parameters for a memory device; setting, by a processing device, a second flag that indicates whether the first critical security parameter file is valid; setting, by a processing device, a third flag that indicates whether a second critical security parameter file exists, the second critical security parameter file including a second set of critical security parameters for the memory device; setting, by a processing device, a fourth flag that indicates whether the second critical security parameter file is valid; and selecting, by a processing device, one of the first or second critical security parameter file as an active critical security parameter file based on an evaluation of the first, second, third, and fourth flags Example 21 is a system including: a memory device; and a processing device coupled to the memory device, the processing device configured to perform operations including: preparing a buffer with critical security parameter update data for updating one of more critical security parameters of the memory device; computing a hash based on the critical security parameter update data; writing the hash to the buffer; writing the buffer to an inactive critical security parameter file; and erasing an active critical security parameter file based on the buffer being successfully written to the inactive critical security parameter file.

Example 22 includes the system of Example 23, wherein the operations further include: based on the writing of the buffer to the inactive critical security parameter file being unsuccessful, providing an error status to a host system.

Example 23 includes the system of any one or more of Examples 21 or 22, wherein the operations further include: based on the erasing of the active critical security parameter file being unsuccessful, providing an error status to a host system.

Example 24 includes the system of any one or more of Examples 21-23, wherein the operations further include: based on the active critical security parameter file being successfully erased, providing a success status to a host system.

Example 25 includes the system of any one or more of Examples 21-24, wherein preparing the buffer with critical security parameter update data includes: incrementing a sequence number; setting a file size; setting a firmware security version; and writing one or more critical security parameters to the buffer.

Example 26 is a method including: preparing, by a processing device, a buffer with critical security parameter update data for updating one of more critical security parameters of a memory device; computing, by the processing device, a hash based on the critical security parameter update data; writing, by the processing device, the hash to the buffer; writing, by the processing device, the buffer to an inactive critical security parameter file; and erasing, by the processing device, an active critical security parameter file based on the buffer being successfully written to the inactive critical security parameter file; and based on the active critical security parameter file being successfully erased, providing a success status.

Example 27 is a computer-readable medium including instructions that, when executed by a processing device, configure the processing device to perform operations including: preparing a buffer with critical security parameter update data for updating one of more critical security parameters of a memory device; computing a hash based on the critical security parameter update data; writing the hash to the buffer; writing the buffer to an inactive critical security parameter file; erasing an active critical security parameter file based on the buffer being successfully written to the inactive critical security parameter file; and based on the erasing of the active critical security parameter file being unsuccessful, providing an error status.

Figure 6:
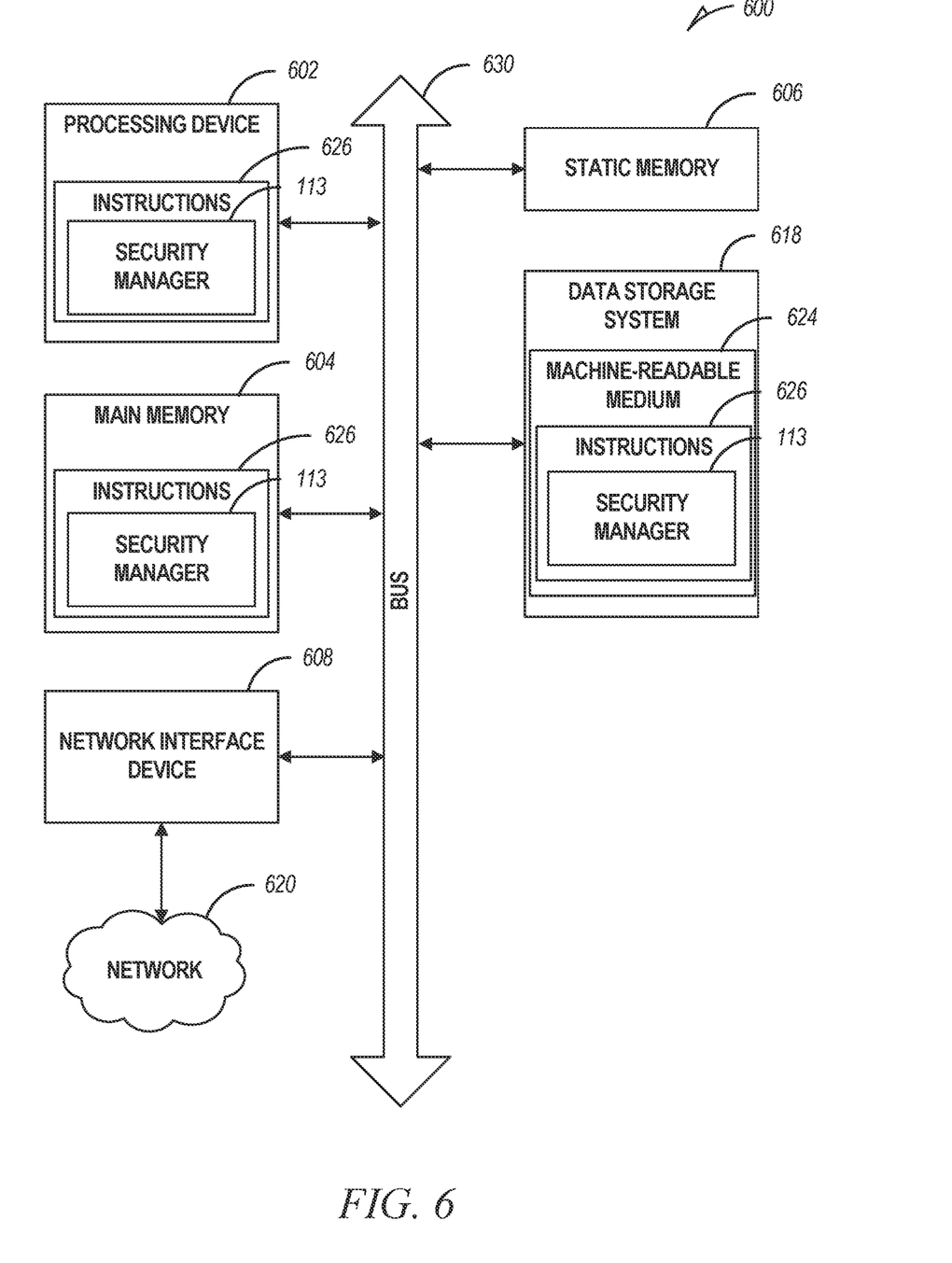
FIG. 6 is a block diagram of an example computer system in which embodiments of the present disclosure may operate.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the security manager 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device 602 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an ASIC, a FPGA, a digital signal processor (DSP), network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a security component (e.g., the security manager 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device coupled to the memory device, the processing device configured to perform operations comprising:
   setting a first flag that indicates whether a first critical security parameter file exists, the first critical security parameter file comprising a first set of critical security parameters for the memory device, the first critical security parameter file comprising a first hash;
   computing a second hash based on the first critical security parameter file;
   based on a result of a comparison of the second hash to the first hash, setting a second flag that indicates whether the first critical security parameter file is valid;
   setting a third flag that indicates whether a second critical security parameter file exists, the second critical security parameter file comprising a second set of critical security parameters for the memory device, the second critical security parameter file comprises a third hash;
   computing a fourth hash based on the second critical security parameter file;
   based on a result of a comparison of the fourth hash to the third hash, setting a fourth flag that indicates whether the second critical security parameter file is valid; and
   selecting one of the first or second critical security parameter files as an active critical security parameter file based on an evaluation of the first, second, third, and fourth flags.

2. The system of claim 1, wherein the operations further comprise:
   executing a first read operation on the first critical security parameter file, the setting of the first flag being based on an outcome of the first read operation; and
   executing a second read operation on the second critical security parameter file, the setting of the third flag being based on an outcome of the second read operation.

3. The system of claim 1, wherein the operations further comprise:
   determining whether the first critical security parameter file is erased, the setting of the second flag being based in part on whether the first critical security parameter file is erased; and
   determining whether the second critical security parameter file is erased, the setting of the fourth flag being based in part on whether the second critical security parameter file is erased.

4. The system of claim 1, wherein:
   the first critical security parameter file comprises a first firmware security version;
   the second critical security parameter file comprises a second firmware security version; and
   the operations further comprise:
   determining whether the first firmware security version is valid, the setting of the second flag being based in part on whether the first firmware security version is valid; and
   determining whether the second firmware security version is valid, the setting of the fourth flag being based in part on whether the second firmware security version is valid.

5. The system of claim 1, wherein the operations further comprise:
   evaluating the first, second, third, and fourth flags using an evaluation table.

6. The system of claim 5, wherein:
   the first critical security parameter file comprises a first sequence number;
   the second critical security parameter file comprises a second sequence number; and
   the operations further comprise:
   evaluating the first and second sequence numbers based on a result of evaluating the first, second, third, and fourth flags using the evaluation table, the active critical security parameter file being selected based on a result of evaluating the first and second sequence numbers.

7. The system of claim 6, wherein evaluating the first and second sequence numbers comprise:
   determining whether the second sequence number is greater than the first sequence number.

8. The system of claim 7, wherein selecting one of the first or second critical security parameter file as the active critical security parameter file comprises selecting the second critical security parameter file as the active critical security parameter file based on determining that the second sequence number is greater than the first sequence number.

9. The system of claim 8, wherein the operations further comprise:
   erasing the first critical security parameter file.

10. The system of claim 7, wherein selecting one of the first or second critical security parameter file as the active critical security parameter file comprises selecting the first critical security parameter file as the active critical security parameter file based on determining that the second sequence number is not greater than the first sequence number.

11. The system of claim 10, wherein the operations further comprise:
    erasing the second critical security parameter file.

12. A method comprising:
    setting, by a processing device, a first flag that indicates whether a first critical security parameter file exists, the first critical security parameter file comprising a first set of critical security parameters for a memory device, the first critical security parameter file comprising a first hash;
    computing a second hash based on the first critical security parameter file;
    based on a result of a comparison of the second hash to the first hash, setting, by a processing device, a second flag that indicates whether the first critical security parameter file is valid;
    setting, by a processing device, a third flag that indicates whether a second critical security parameter file exists, the second critical security parameter file comprising a second set of critical security parameters for the memory device, the second critical security parameter file comprising a third hash;

computing a fourth hash based on the second critical security parameter file;

based on a result of a comparison of the fourth hash to the third hash, setting, by a processing device, a fourth flag that indicates whether the second critical security parameter file is valid; and selecting, by a processing device, one of the first or second critical security parameter files as an active critical security parameter file based on an evaluation of the first, second, third, and fourth flags.

13. The method of claim 12, further comprising:
executing a first read operation on the first critical security parameter file, the setting of the first flag being based on an outcome of the first read operation; and
executing a second read operation on the second critical security parameter file, the setting of the third flag being based on an outcome of the second read operation.

14. The method of claim 12, further comprising:
determining whether the first critical security parameter file is erased, the setting of the second flag being based in part on whether the first critical security parameter file is erased; and
determining whether the second critical security parameter file is erased, the setting of the fourth flag being based in part on whether the second critical security parameter file is erased.

15. The method of claim 12, further comprising:
the first critical security parameter file comprises a first firmware security version;
the second critical security parameter file comprises a second firmware security version; and
the method further comprises:
determining whether the first firmware security version is valid, the setting of the second flag being based in part on whether the first firmware security version is valid; and
determining whether the second firmware security version is valid, the setting of the fourth flag being based in part on whether the second firmware security version is valid.

16. The method of claim 12, wherein:
the first critical security parameter file comprises a first sequence number;
the second critical security parameter file comprises a second sequence number; and the method further comprises:
evaluating the first and second sequence numbers based on a result of the evaluation of the first, second, third, and fourth flags, the active file being selected based on a result of evaluating the first and second sequence numbers, the evaluating the first and second sequence numbers comprising determining whether the second sequence number is greater than the first sequence number.

17. The method of claim 16, wherein:
selecting one of the first or second critical security parameter file as the active critical security parameter file comprises selecting the second critical security parameter file as the active critical security parameter file based on determining that the second sequence number is greater than the first sequence number; and
the method further comprises erasing the first critical security parameter file.

18. A non-transitory computer-readable storage medium comprising instructions that, when executed by a processing device, configure the processing device to perform operations comprising:
setting, by a processing device, a first flag that indicates whether a first critical security parameter file exists, the first critical security parameter file comprising a first set of critical security parameters for a memory device, the first critical security parameter file comprising a first hash;
computing a second hash based on the first critical security parameter file;
based on a result of a comparison of the second hash to the first hash, setting, by a processing device, a second flag that indicates whether the first critical security parameter file is valid;
setting, by a processing device, a third flag that indicates whether a second critical security parameter file exists, the second critical security parameter file comprising a second set of critical security parameters for the memory device, the second critical security parameter file comprises a third hash;
computing a fourth hash based on the second critical security parameter file;
based on a result of a comparison of the fourth hash to the third hash, setting, by a processing device, a fourth flag that indicates whether the second critical security parameter file is valid; and
selecting, by a processing device, one of the first or second critical security parameter files as an active critical security parameter file based on an evaluation of the first, second, third, and fourth flags.

* * * * *